Figures 1, 4:
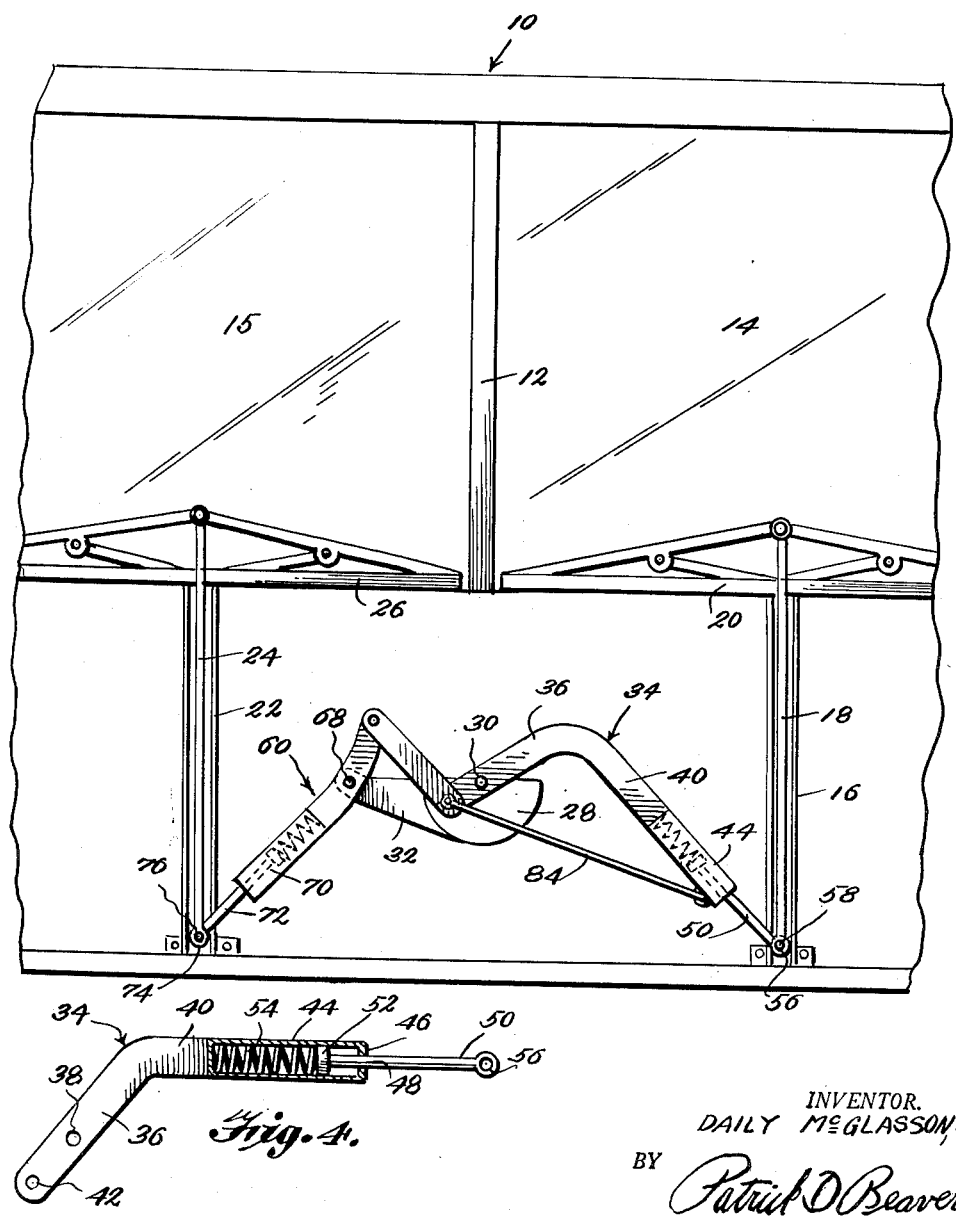

May 11, 1954

D. McGLASSON, SR 2,677,844

WINDSHIELD WIPER

Filed Nov. 14, 1952

2 Sheets-Sheet 1

INVENTOR.
DAILY McGLASSON SR.

BY Patrick D. Beavers

ATTORNEY

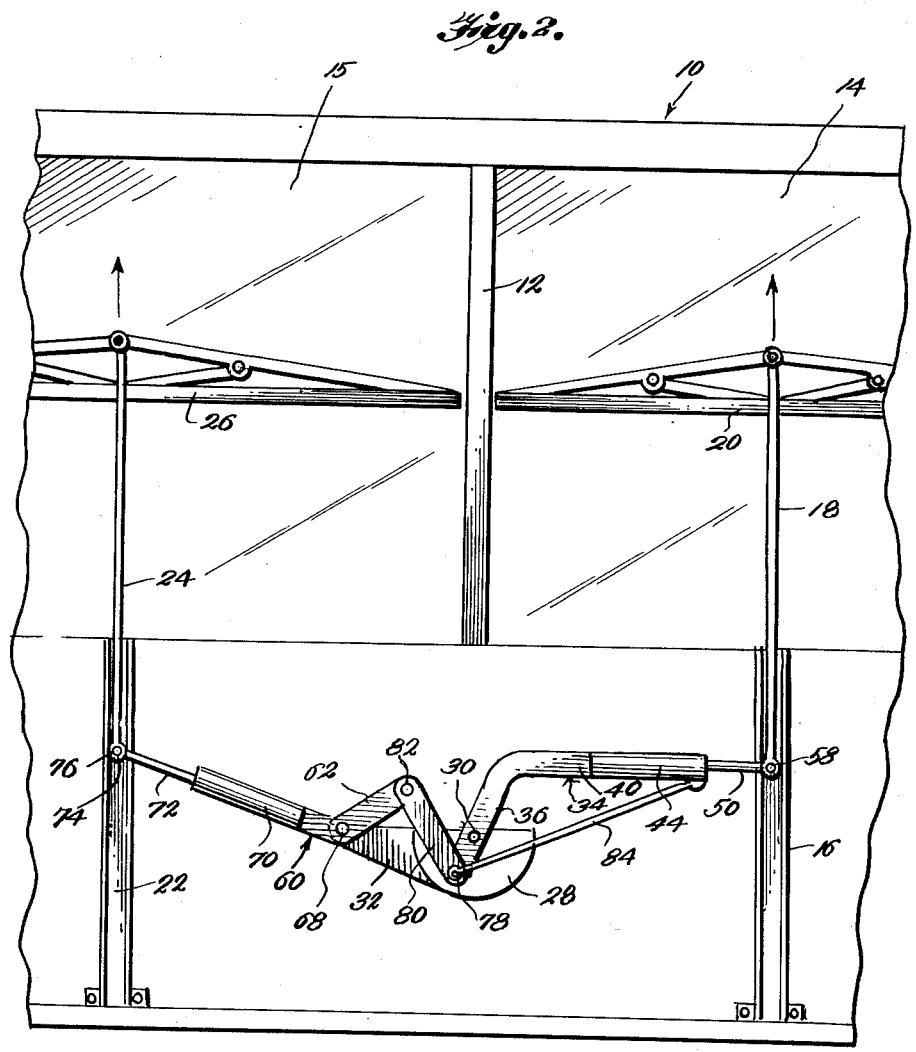
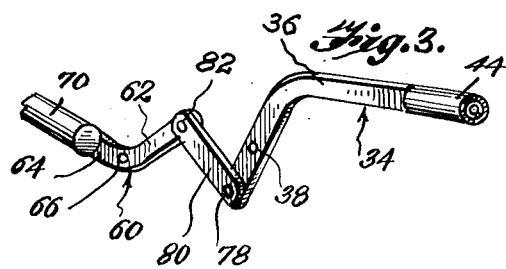

Patented May 11, 1954

2,677,844

UNITED STATES PATENT OFFICE 2,677,844

WINDSHIELD WIPER

Daily McGlasson, Sr., Benton, Ill.

Application November 14, 1952, Serial No. 320,563

2 Claims. (Cl. 15—251)

This invention relates to a windshield wiper and has for its primary object to clean the entire area of a conventional windshield from the top to the bottom thereof.

Another object is employ the conventional windshield wiper motor as the motive power for operating the windshield wipers without materially altering the motor.

The above and other objects may be attained by employing this invention which embodies among its features a wiper for a windshield comprising a plunger rod mounted to move in an upwardly extending path adjacent one face of the windshield, a wiper blade carried by the plunger and extending substantially horizontally across the adjacent face of the windshield, an extensible rock arm carried by the motor shaft of a conventional windshield wiper motor for oscillation with said shaft, and means connecting the arm to the plunger for raising and lowering the plunger as the rock shaft oscillates.

Other features include a bracket carried by the windshield motor and extending laterally therefrom, a second extensible arm pivotally connected to the bracket for oscillation about an axis which lies parallel with the axis of the windshield motor shaft, a second plunger mounted below the windshield for movement in a path adjacent one side of the windshield and connnected to the second rock arm, a windshield wiper blade carried by the second plunger for movement over an area of the windshield adjacent that engaged by the first mentioned blade, and a link connected to the first mentioned rock arm and to the second mentioned rock arm to cause the second mentioned rock arm to move in unison with the first mentioned rock arm.

In the drawings:

Figure 1 is a front view of a windshield showing this improved windshield wiper mounted in operative relation to the windshield with the wiper blades in lowered position, Figure 2 is a similar view to Figure 1 showing the wiper blades in a partially elevated position, Figure 3 is a fragmentary perspective view of the rock arms, and Figure 4 is a side view of one of the rock arms showing a portion thereof in section more clearly to illustrate the details in construction.

Referring to the drawings in detail a vehicle designated generally 10 carries a conventional windshield which is usually separated by a vertical mullion 12 into two panels 14 and 15 respectively. Mounted below the panel 14 on the vehicle and adjacent the side of said panel to be cleaned by the windshield wiper is an upwardly extending guide channel forming a trackway 16 in which is mounted for sliding movement adjacent the side of the panel to be cleaned a plunger rod 18 carrying at its upper end a transversely extending wiper blade 20 which extends throughout the entire width of the panel 14 as will be readily understood upon reference to the drawings.

A similar guide channel is mounted below the panel 15 substantially midway between opposite ends thereof to form a guideway 22 for a plunger rod 24 which moves upwardly and downwardly adjacent the base of the panel 15 to be cleaned. A wiper blade 26 is carried by the plunger rod 24 adjacent its upper end and it will thus be seen that as the plunger rods 18 and 24 are moved in their respective guideways 16 and 22, the blades 20 and 26 will be moved adjacent and in contact with their respective panels 14 and 16 to remove from the surface thereof any accumulation of moisture or the like.

Mounted on the vehicle 10 below the mullion 12 is a conventional windshield wiper motor 28 carrying a conventional oscillating shaft 30 which oscillates about an axis which lies substantially parallel to the longitudinal axis of the vehicle. A bracket arm 32 is carried by the housing of the motor 28 and extends laterally therefrom as will be readily understood upon reference to the drawings.

Fixed to the rock shaft 30 of the motor 28 for oscillatory motion therewith is a rock arm designated generally 34 which comprises a leg 36 having an opening 38 intermediate its ends for the reception of the rock shaft 30 and carrying adjacent one end an angular extension 40 while said leg 36 is provided adjacent its opposite end with an opening 42, the axis of which lies parallel to the axis of the opening 38. Carried by the extension 40 adjacent the end thereof remote from the leg 36 is a tubular body 44 carrying at its end remote from the extension 40 a head 46 having an axial opening 48 extending therethrough. A plunger 50 is mounted to slide through the opening 48 and carries at its end which is disposed within the tubular body 44 a head 52 which serves as an abutment for one end of a compression coil spring 54, the opposite end of which abuts the end of the tubular body 44 remote from the end 46. The end of the plunger 50 remote from that carrying the head 52 is provided with an eye 56 for the reception of a pivot pin 58 by means of which the rock arm 34 is pivotally coupled to the plunger rod 18 previously described.

A similar rock arm designated generally 60 comprising a leg 62 carrying adjacent one end an angular extension 64 is provided adjacent the junction of the leg 62 and the extensions 64 with an opening 66 for the reception of a pivot pin 68 carried by the bracket arm 32 to pivotally couple the rock arm 60 to the housing of the motor 28. The end of the extension 64 remote from the leg 62 is provided with a tubular body 70 which corresponds in all respects to the tubular body 44 and through the end of which remote from the extension 64 extends a plunger 72 which like the plunger 50 is urged outwardly by a compression coil spring housed within the tubular body 70. An eye 74 is carried by the plunger 72 remote from that which enters the tubular body 70 and is coupled through the medium of a conventional pivot pin 76 to the plunger rod 24.

Pivotally connected as at 78 to the rock arm 34 by a pivot which extends through the opening 42 of the leg 36 is one end of a link 80, the opposite end of which is pivotally connected as at 82 to the leg 62 of the rock arm 60 so that as the rock arm 34 is moved by the oscillating shaft 30 of the motor 28, the rock arm 60 will be moved in unison therewith.

In operation, with the windshield wiper motor 28 energized, the rock shaft 30 thereof will oscillate and move the rock arm 34 to cause the plunger rod 18 to reciprocate and move its wiper blade 20 against the surface of the panel 14 of the windshield. Simultaneously with the movement of the rock arm 34, the rock arm 60 will be oscillated about its pivot 68 through the medium of the link 80 to cause the plunger rod 24 to move and move the blade 26 against the panel 15 of the windshield. If so desired a suitable brace bar 84 may be coupled to the leg 36 of the rock arm at its pivotal connection 78 with the link 80 and to the tubular body 44 at the end thereof remote from the extension 40 to reinforce and brace the rock arm 34.

From the foregoing it will be obvious that by extending the wiper blades 20 and 26 throughout the entire width of their respective panels 14 and 15, and moving the wiper blades throughout the height thereof, a clear vision through the windshield may be maintained.

What I claim is:

1. In a vehicle having a windshield and a windshield wiper operating motor of the type having a shaft which oscillates along an axis which lies transversely of the windshield, a bracket carried by the windshield wiper operating motor and extending laterally therefrom, a pair of spaced parallel upwardly extending channel guides carried by the vehicle on opposite sides of the motor below the windshield, plunger rods mounted in the channel guides for upward movement adjacent one side face of the windshield, wiper blades carried by the plunger rods and engaging the adjacent side face of the windshield in adjacent areas, an extensible rock arm carried by the rock shaft for oscillation therewith and connected to one of the plunger rods for moving it adjacent the windshield as the rock shaft oscillates, a second extensible rock arm mounted on the bracket for rocking movement about an axis which lies parallel to the rock shaft, said second rock shaft being connected to the other plunger rod for moving it adjacent the windshield as said second rock arm oscillates, and a link operatively connecting the rock arms to cause them to move in unison.

2. In a vehicle having a windshield and a windshield wiper operating motor of the type having a shaft which oscillates along an axis which lies transversely of the windshield, a wiper for said windshield comprising a plunger rod mounted to move in an upwardly extending path adjacent one face of the windshield, a wiper blade carried by the plunger and extending substantially horizontally across the adjacent face of the windshield, an extensible rock arm carried by the motor shaft for oscillation therewith and connected to the plunger for raising and lowering the plunger as the rock shaft oscillates, said rock arm including an elongated tubular body mounted on the rock shaft to oscillate therewith, a rod mounted in said tubular body to move through the end thereof remote from the rock shaft, a head on the rod within the body, a compression coiled spring mounted within the body and engaging the head to yieldingly urge the rod outwardly relative to the body, and means carried by the rod adjacent the end thereof remote from the head for pivotally connecting the rod to a plunger rod.

References Cited in the file of this patent

UNITED STATES PATENTS

| Number | Name | Date |
| --- | --- | --- |
| 2,131,341 | Waters | Sept. 27, 1938 |